Figure 1:
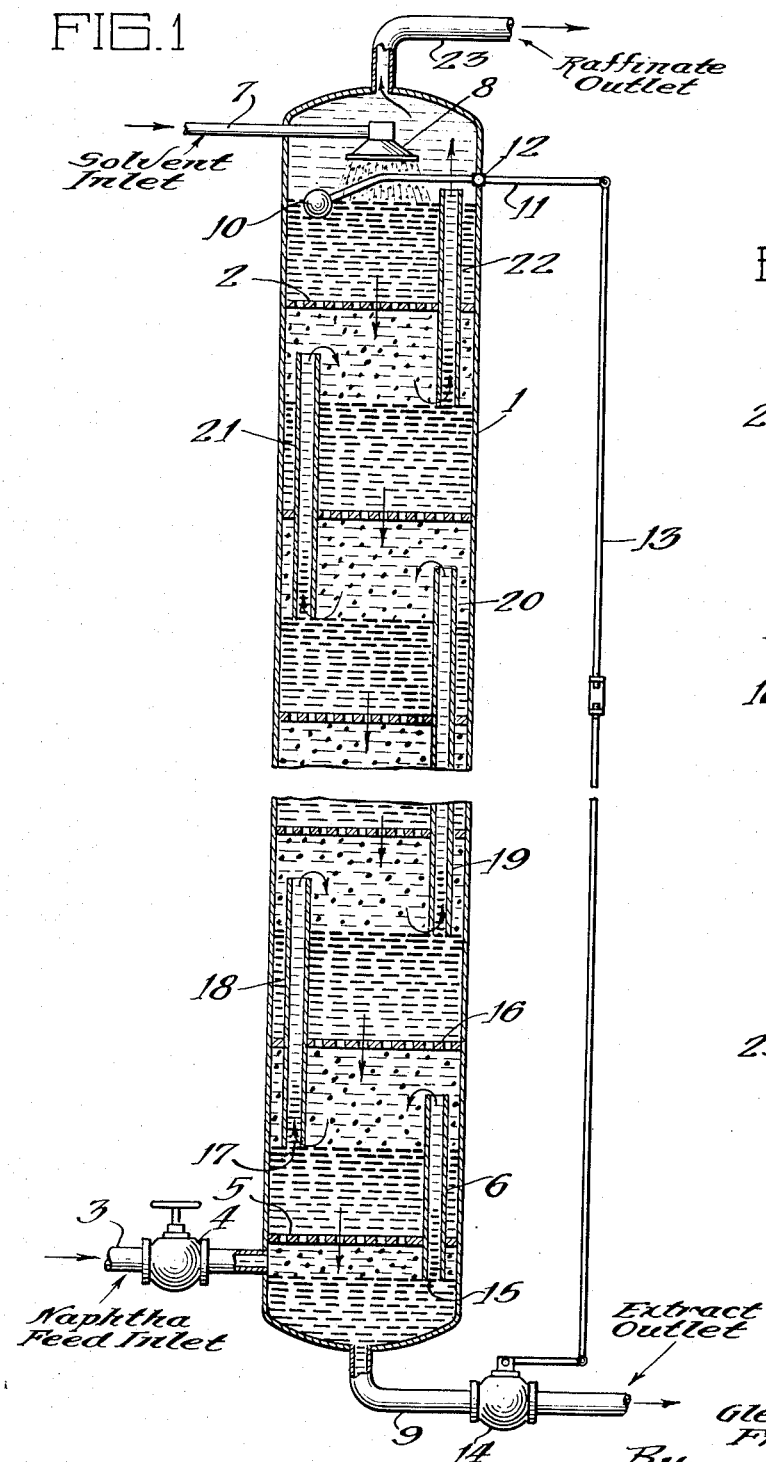

Aug. 4, 1953  G. R. GRUNEWALD ET AL  2,647,855
APPARATUS AND PROCESS FOR COUNTERCURRENT
LIQUID-LIQUID EXTRACTION
Filed Oct. 10, 1951

Inventors
Glen R. Grunewald
Fred J. Pierce
By Chester J. Giuliani
Donald E. Mohling
Attorneys

UNITED STATES PATENT OFFICE 2,647,855

APPARATUS AND PROCESS FOR COUNTER-CURRENT LIQUID-LIQUID EXTRACTION

Glen R. Grunewald, Chicago, and Fred J. Pierce, La Grange, Ill., assignors to Universal Oil Products Company, Chicago, Ill., a corporation of Delaware Application October 10, 1951, Serial No. 250,696

7 Claims. (Cl. 196—14.41)

This invention relates to a countercurrent extraction or contacting process and to a particular device for dispersing the heavier of two phases in countercurrent contact with the lighter phase. More specifically, the invention concerns a liquid-liquid or liquid-gas countercurrent solvent extraction or absorption process having a single liquid level control device on the uppermost plate thereof, and means cooperating between said plate and other plates in the column for maintaining the interface between the fluids on said other plates at a constant level.

The apparatus of this invention provides a solution for one of the major problems associated with the operation of present countercurrent extraction columns utilizing sieve-deck trays and a liquid as at least one of the fluid phases in the column. These problems primarily arise from the difficulty of concurrently maintaining the interface between the fluid phases on all of the sieve-deck trays within the column at a constant level during the extraction, a condition which is essential for satisfactory operation of the extraction column. In most sieve-deck columns of recent design the column is difficult to control and in many cases operates in the absence of a second phase on one or more of the trays, particularly when some of the tray perforations become clogged during operation, resulting in a large loss of column efficiency. The apparatus of this invention is particularly adapted for maintaining a constant interface level on all of the plates comprising the column, thus maintaining equilibrium conditions on all of the plates and resulting in operation of the column at maximum efficiency during the entire period of operation.

An object of this invention is to provide a multiple perforated plate extraction column having a liquid level control device on its uppermost plate capable of maintaining the liquid interface between the light and dense phases on all plates within the column at a constant level.

Another object of this invention is to provide a liquid-liquid or liquid-gas extraction apparatus wherein more efficient contact of raffinate and extract phases and greater control of the flow of said phases is obtained, thereby yielding improved separation results.

In one of its embodiments the invention concerns a washing column for countercurrenly contacting substantially immiscible fluids of different specific gravities, at least one of which is a liquid, in a plurality of superimposed contacting zones within said column wherein the interface between the relatively dense liquid and the relatively light fluid in each zone is maintained at a substantially constant level, said column comprising a housing, a dense liquid inlet in an upper portion of said housing, a light fluid inlet below said dense liquid inlet, a dense liquid outlet in the lower portion of said column, a light fluid outlet in the upper portion of said column, a plurality of substantially horizontally disposed perforated partitions in said housing which form a plurality of superimposed contacting zones each adapted to maintain said heavy liquid and light fluid therein with an interface therebetween, a conduit extending substantially vertically through each of said partitions, and having a light fluid inlet opening in its lower portion at the interface between the dense and light fluid layers in a contacting zone below each of said partitions and a light fluid outlet opening in its upper portion in the light fluid layer above the interface between said heavy liquid and light fluid in a contacting zone above each of said partitions, and a liquid level control means connecting to said column and operating in response to the interface level in the uppermost contacting zone in said column.

Another embodiment of this invention relates to a process for countercurrently contacting fluids of different specific gravities not wholly miscible with each other at least one of which is a relatively dense liquid, in superimposed fluid-liquid contacting zones separated by perforated partitions, each of said zones comprising a partition, a relatively dense liquid layer above said partition and a relatively light fluid layer above said dense liquid layer, and separated by an interface therebetween, said process comprising introducing said heavy liquid into the uppermost contacting zone, introducing light fluid into a contacting zone below said uppermost zone, accumulating said dense liquid in a layer above said partition, accumulating a light fluid in a layer below said partition, conducting said dense liquid through perforations in said partition in the form of droplets, through the light fluid layer accumulating below said partition, conducting said relatively light fluid through a conduit extending from the light fluid layer below said partition between said layer of light fluid above the interface in a superimposed contacting zone above said partition, maintaining the interface between the light fluid and dense liquid above said partition at a constant level, withdrawing light fluid from above said interface and withdrawing dense liquid from below said interface.

Other objects and embodiments of the present invention relating to specific aspects thereof and to various alternative modifications in the process and apparatus of the present invention will be further described in greater detail in the following further description of the invention.

The present invention provides an improved apparatus and process for operating a countercurrent fluid-fluid contacting or extraction process wherein a liquid of higher density is passed through a fluid, either liquid or gaseous, of lower density in finely divided droplet form and in multiple contacting zones distributed throughout the length of a vertical extraction column and separated by vertically spaced perforated plates through which the heavy liquid is conducted. The apparatus and process provide a means for maintaining the interface between the two substantially immiscible fluid layers on each of the perforated plates at a substantially constant level by controlling the level of the interface between the fluids on the uppermost plate with the aid of a level control device which adjusts the rate of flow and pressure relationships in each of the contacting zones below the upper plate, thereby maintaining the interface level substantially constant in all of the zones simultaneously. The apparatus and process is particularly adapted to the extraction of a specific component or a class of components from a selected charging stock utilizing a solvent which is selective for the component or class of components to be recovered. The apparatus and process may also be used for countercurrently washing one liquid with another liquid to remove certain impurities or to recover certain components therefrom, the liquids being substantially immiscible in each other and of different specific gravities. A further adaptation of the present process and apparatus is exemplified by countercurrently washing a gaseous stream with a liquid solvent to recover or remove a particular component of the gas. It is an inherent qualification in fluid-fluid extraction, of course, that the component to be recovered be more soluble in the extractive solvent than the remaining undesired component or components accompanying the former in admixture therewith. Thus, the system may be utilized to recover liquid aromatic hydrocarbons from liquid hydrocarbon charging stocks, such as petroleum fractions containing paraffinic, olefinic and/or naphthenic hydrocarbons in addition to the aromatic component to be recovered; for the removal by washing of undesired components from gasoline boiling range fractions, such as the removal of phenolic compounds and sulfur-containing compounds such as mercaptans from gasoline stocks utilizing an aqueous caustic solution as the extracting agent; for the washing of gaseous mixtures with a liquid solvent for one or more of the components of the gas, as for example, in the removal of sulfur dioxide from an air mixture thherewith; for recovery of metallic salts, such as silver and mercury salts from aqueous solutions utilizing a water-immiscible solvent for the salt, such as carbon disulfide, and for other uses in which countercurrent, fluid-fluid contacting or extraction is desired for the separation of a particular component of one of the fluids. Suitable solvents for the purpose may be characterized generally as any gas or liquid which is selectively miscible with the component or components of the feed stock mixture to be recovered or removed therefrom. Thus, for example, selective solvents for aromatic hydrocarbons and in which paraffinic hydrocarbons are not soluble to the same extent are such organic liquids as furfural, phenol, the glycols, such as oxydiethylene glycol, dioxytriethylene glycol, oxydipropylene glycol, $\beta,\beta^1$-dioxydipropionitrile, etc. Water is a common solvent for the extraction of metallic salts from organic media and may be utilized as a selective solvent therefor. Aqueous caustic solutions or aqueous amines may be utilized as extractive solvents for phenols, etc.

The apparatus of the present invention and one of the methods for effecting the general process of the invention are further illustrated and described in Figure 1 of the accompanying drawing which depicts a vertical tubular tower containing multiple liquid-liquid contacting zones in each of which a liquid interface is maintained. Although the process and apparatus of this invention are particularly effective for the recovery of one or more hydrocarbon components from a liquid hydrocarbon feed stock utilizing a liquid solvent or extractant, the feed stock may also consist of any other liquid mixture of separable components or a normally gaseous feed stock of such components which may be subjected to absorption in the gaseous condition in a liquid solvent or which may be liquefied at suitable operating pressures and temperatures adapted to the present apparatus and subjected to solvent extraction. For the sake of simplicity of description, the method of extraction is described with reference to a feed stock comprising a liquid petroleum naphtha fraction boiling in the range in which the azeotropes of a specific aromatic hydrocarbon are present, such as benzene (the hydrocarbon azeotropes of which boil within the range of from about 65° to about 81° C.) and utilizing as a selective solvent for the benzene component an aqueous oxydiethylene glycol solution. The solvent in this case being the denser of the two liquid phases ultimately present within the column, is introduced into the top of the column in accordance with the process of this invention. The solvent, however, may also consist of other liquid or liquefiable compounds suitable for the purpose and may have either a higher or lower specific gravity than the feed stock and thus may be introduced into the extraction column either into the upper or lower portion thereof.

Referring to Figure 1 of the diagrammatic drawing, the extraction column comprises, in general, a vertical housing 1 in the form of a generally vertical tubular column containing multiple, substantially horizontally disposed perforated plates spaced vertically within and attached to the inner circumferential surface of the column, as for example, sieve deck 2 comprising the uppermost plate in the extraction column. Each plate separates a contacting zone in which a relatively dense liquid phase is countercurrently conducted in the form of finely divided droplets through a light fluid phase, which in the description of the present drawing is a relatively light liquid hydrocarbon. Although the diagram illustrates a sieve-deck as one of the alternative embodiments of the perforated partitions separating the multiple contacting zones within the housing which are spaced vertically in the extraction column housing, the perforated partition may also comprise one or more bubble decks commonly employed in extraction columns of the type illustrated. In the lower portion of the extraction column, preferably below the lowermost perforated plate thereof, a conduit 3 connects to the column for admitting feed stock therein, which in the present description is the naphtha fraction of a petroleum distillate. The naphtha inlet rate of flow must be a finite value, however small, up to a value less than that sufficient to establish a differential in pressure of the light fluid below each partition greater than the head of heavy fluid above each partition and may be controlled to obtain any desired degree of extraction by an appropriate flow control device, such as valve 4 in the illustration. The feed stock introduced into the column through conduit 3, accumulates in a layer below the perforated partition in the lower portion of the column such as plate 5 and eventually flows upwardly in the column through the riser conduit 6 comprising an upcomer in the lower portion thereof, said riser projecting through perforated plate 5 into the light hydrocarbon phase of a superimposed contacting zone above the latter plate 5. When the column is initially put into operation, naphtha feed stock is preferably run into the column until the entire column is filled with feed stock, and thereafter the solvent is introduced until equilibrium is established between the respective solvent and feed stock streams, as hereinafter described.

The solvent, which for the purpose of illustrating a typical extractant utilizable in the present apparatus and process is an aqueous oxydiethylene glycol, preferably contains an amount of water sufficient to provide a selective or preferential solvent for the aromatic hydrocarbon components of the feed stock but not for other hydrocarbons present which may likewise accompany the aromatic components in the naphtha. For oxydiethylene glycol, the amount of water which provides a selective solvent for the aromatic hydrocarbons is from about 5 to about 15% by weight, the solvent being introduced through a solvent inlet in the upper portion of the extraction column. When the solvent is the denser of the two fluid phases introduced into the extractor column, the solvent inlet conduit is above the uppermost perforated partition of the column, such as inlet conduit 7 in the accompanying drawing which may have a spray head 8 attached to the end of the conduit within the column for comminuting the liquid stream into finely divided droplets, thereby increasing the area of contact between the solvent and feed stock or raffinate phase present in the extraction column. The flow rates of solvent and feed stock into the column are determined by the withdrawal rates of the raffinate and extract phases from the column through their respective outlet ports, which, in turn, are dependent upon the purity and percentage recovery of the aromatic product desired from the feed stock. It is of course essential when the column is to be operated on a continuous basis that the pressure on the light fluid entering the bottom of the column exceeds the pressure on the dense liquid introduced into the upper portion of the column. The raffinate comprising the phase of least specific gravity in the upper portion of each of the multiple liquid-fluid contacting zones above each perforated partition and comprising the residue of the feed stock after removal of at least a portion of the aromatic hydrocarbon therein is conducted upwardly through the risers extending through each of the perforated plates until the space above the uppermost plate 2 in the column is reached where the raffinate accumulates and is withdrawn from the column at a controlled rate.

A liquid level control device in the uppermost contacting zone of the extraction column is provided in the present apparatus in order to control the interface level between the dense liquid and light fluid phases in the contacting zone on the top plate of the column. The device controls the interface levels on each of the lower plates in the column and is thus preferably on the uppermost plate to obtain maximum effect of the trays provided in the column; although the interface level control may be placed in a separation zone on a lower plate within the column, such an arrangement obviously provides no advantage in a multiple-tray column, since the control device exerts no interface level control in any contacting zone above the zone in which the device is placed. The interface level varies directly with the extract rate of flow from the column, since the removal of dense phase extract from the bottom of the column reduces the internal pressure within the column against the dense fluid above the perforations in the plate immediately above the extract outlet, that is, plate 5, and allows more of the dense fluid above plate 5 to flow through the perforations. As the level of dense fluid on plate 5 falls, the drop in pressure is transmitted through each of the perforated plates above plate 5, including uppermost plate 2, causing a simultaneous flow of dense liquid through the perforations in all of the plates and lowering the interface level on plate 2. As the interface level on plate 2 falls, the interface level sensing device in the contacting zone on plate 2 actuates an extract flow control device on the extract outlet, conduit 9, either allowing a greater or lesser volume of extract to be withdrawn from the column and thereby reestablishing the equilibrium pressure relationships within the column.

The interface level in the contacting zone above perforated partition 2 may also be maintained constant by controlling the rate of flow of solvent into said contacting zone on the uppermost plate 2 and the latter comprises an alternative, although less preferred, means of maintaining the interface levels in each of the contacting zones within the column at a constant level.

The liquid level control device illustrated at the interface of the uppermost plate 2 comprises an interface level sensing element such as ball float 10 attached to a lever arm 11, pivotally connected to the column housing at a fulcrum point 12, the arm 11 protruding from the column housing and connecting outside of the column, beyond the fulcrum to a connecting rod 13 which actuates a suitable solvent inlet or extract outlet flow control means such as extract outlet valve 14, the connecting rod raising or lowering the valve seat in valve 14, thereby determining the flow of extract from the extraction column in response to the rise and fall of the interface level between the dense liquid and light fluid on the uppermost plate of the column and in cooperation with the ball float sensing element at the interface on said plate. In the operation of the column wherein the interface level control on the uppermost plate is determined by control of the extract outlet rate of flow, the naphtha feed stock rate and solvent inlet rate of flow are controlled at a predetermined valve for obtaining a certain desired recovery of aromatic hydrocarbon. Any rise of the interface level in the uppermost contacting zone on plate 2, due to the accumulation of dense or lower phase on the plate, causes in response thereto the interface level sensing element (ball float 8) to rise, which in turn forces connecting rod 10 downwardly and opens extract outlet valve 4. The latter permits an additional quantity of extract to flow from the column through conduit 9 and re-established the equilibrium pressure within the column. In the actual operation of the column, the rise and fall of the interface levels on each of the perforated plates is relatively minute and the pressure variations within the column fluctuate through a very narrow range; the flow of dense phase through the perforations on each of the plates is at a substantially constant rate when the column is in equilibrium; the flow of solvent and feed stock through their respective inlet conduits into the column is continuous; the flow of raffinate from the column is constant and continuous; valve 14 opens and closes only partially to accommodate the slight pressure variations and the flow of extract from the column is therefore substantially constant and continuous; the entire column appears to be in balanced operation. It is characteristic of the operation of the column that the rate of transfer of both dense and light liquids between each of the plates is uniform and the total amount of both dense and light fluids exchanged between the contacting zones on each plate is uniform throughout the column. Although the size and number of perforations in each plate is desirably the same for all of the plates in order to provide maximum efficiency of extraction, the fact that one or more of the perforations in one or more of the sieve decks becomes clogged does not interrupt the operation of the column or cause a diminution of either of the fluid layers above any of the plates, the rate of flow through the remaining perforations automatically being increased to compensate for the loss in flow through the clogged perforation or perforations.

The length of the conduit risers extending through each of the perforated plates, from the contacting zone below each partition into the contacting zone above each partition, determines the position of the interface between the dense liquid and light fluid on each of the plates, except the uppermost plate 2, which interface is fixed by the response of the dense liquid flow control means in either the dense liquid inlet or outlet conduits to an interface level sensing element in the contacting zone on said plate 2. The series of riser conduits present in the column in essence comprises an upcomer portion extending below each of the perforated partitions to the interfaces below the partitions and containing a light fluid inlet, and a riser portion extending into the light fluid layers in each of the contacting zones above each of the partitions and containing a light fluid outlet.

The hydrocarbon phase below plate 5 in the lower portion of the column flows from the naphtha feed inlet conduit 3 across the path of the descending droplets of solvent or discontinuous extract phase formed by the perforations in plate 5, through the opening 15 in the lower portion of riser conduit 6, and upwardly through riser 16 in preference to the perforations in plate 5, due to the difference in hydrostatic head of the fluid in riser pipe 6 and the layer of relatively more dense solvent phase above the perforations in plate 5. The hydrocarbon phase, thereafter flows out of the top of the riser portion of conduit 6, into the light phase layer above plate 5, across the column in contact with the droplets of solvent dropping through the perforations in superimposed partition 16, into the opening 17 at the end of upcomer 18 and into the light phase layer of the contacting zone above plate 16. The light phase outlet openings in the riser pipes such as 6 and 18 which extend into the upper layer hydrocarbon phase of the contacting zones is preferably as high above the level of the interface between the hydrocarbon and extract phases as possible to permit maximum contact between the downwardly flowing finely divided droplets of glycol extractant and the continuous hydrocarbon phase. The light phase outlet openings of the risers are preferably on the opposite side of the column on which the light phase inlet openings of the risers are located, to permit transverse flow of the light phase (hydrocarbon) across the region of descending droplets of extractant falling downwardly from the perforated plates into the extract layer, thereby providing an increased area of contact between the hydrocarbon and extractant phases and increasing the efficiency of extraction. In a similar manner, the light hydrocarbon phase flows upwardly through the column through conduits 19, 20, and 21, eventually flowing through the light phase inlet opening in the upcomer portion of conduit 22, upwardly therein, past the spray head 8 and finally out of the top of the column into raffinate outlet conduit 23. The raffinate may be sent to storage or into a series of succeeding extraction columns as the inlet feed stock thereto for further extraction of the aromatic components therefrom, if incomplete in one column or for the removal of other components therefrom in succeeding extraction columns which may employ other selective solvents, as desired. As a result of the enhanced efficiency of the present extraction procedure, however, the raffinate outlet removed from the column through conduit 16 consists essentially of paraffinic hydrocarbons, naphthenic hydrocarbons, and olefins when the charging stock to the column is a petroleum naphtha fraction containing the above classes of hydrocarbons and when a sufficient number of perforated plates are present in the extraction column to effect the desired degree of separation. In thus flowing upwardly through the column, the light fluid filling the riser tube and extending from the upper light fluid phase above one of the perforated plates to the light fluid phase of the plate immediately above it provides the continuous phase through which the relatively heavy liquid extractant is passed in droplet form, the extract or solvent phase thus comprising the discontinuous phase present in the extraction column.

Figure 2:
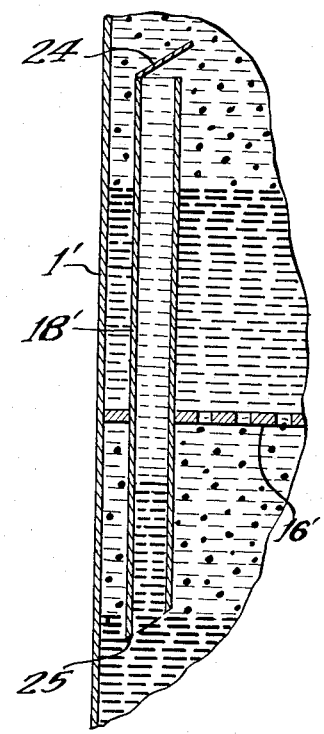

One of the preferred designs for the riser conduits extending between the perforated partitions of the present extraction or contacting column is illustrated in Figure 2 of the accompanying drawing which represents a cut-away section of a typical extraction column. The preferred design illustrated comprises a housing 1', a conduit 18' comprising an upper riser portion above the perforated partition or plate 16', and a lower upcomer portion extending below the plate 16' which is fastened to the inside surface of housing tube 1'. The riser pipe 18' has a baffle member 24 placed over an orifice in the upper portion of pipe 18', as for example, over the top end of the pipe to allow the rising hydrocarbon phase to flow through the riser, but also spaced sufficiently close to the top, open end of conduit 18' to prevent any substantial proportion of the down-flowing droplets of the dense phase solvent to enter the riser conduit. Baffle member 24 may simply be a tipped cap, as illustrated in Figure 2, fastened on one of its edges to the top edge of riser pipe 18'.

A further improvement in the design of the upcomer portion of the conduit 18' is the angular termination of the light fluid inlet end of the conduit, such that the lowermost tip 25 of the pipe extends into the dense phase below the dense and light liquid interface. The opening defined by the bottom of the pipe thus extends across the interface and permits the segregation of the light fluid from the dense liquid phase prior to the upward flow of the light fluid into the conduit 18'. When the inlet end of the upcomer conduit terminates at right angles to the vertical pipe, the riser opening is on the same plane as the interface and if there is any tendency for the dense phase (solvent in this illustration) to emulsify with the feed stock, the turbulence at the opening of the upcomer due to flowing around the edge of the upcomer tube increases the tendency toward emulsification, particularly when the light phase rate of flow is high. The dense phase therefore tends to accompany the light phase up the conduit, thereby decreasing the differential in head between the column of fluid in the conduit and the column of combined heavy and light fluid above the perforated partition, the latter differential being essential to proper operation of the column. The present design of the riser pipe tends to reduce emulsification, thereby obviating the variation in density of the fluid in conduit 18' due to excessive inclusion of solvent therein.

In the normal operation of the present extraction or contacting column utilizing a fluid-liquid system of feed stock and solvent, at least a portion of the dense liquid phase in the column tends to rise in the upcomer conduit as the result of the aforementioned tendency of most solvents to emulsify with the feed stock (particularly with liquid feed stocks) as well as the tendency of the dense liquid phase to be entrained in the light fluid as the latter enters the relatively constricted opening in the conduit where the velocity of flow is greater. In addition to these factors, the dense fluid at the interface operates as a seal of the upcomer opening which is broken only when the accumulation of light fluid phase above the interface (below the perforated partition) increases the downward pressure on the dense fluid phase sufficiently to force the interface below the light fluid inlet opening in the conduit. In response to this constant downward pressure on the heavy liquid interface, the heavy liquid partially fills the upcomer, tending to decrease the differential between the head of the column of fluid over the perforated partition and the head of the column of fluid in the conduit. It is only when the pressure of the light phase on the bottom of the perforated partition is greater than the head of combined heavy and light phases on the top of the perforated partition, as for example, when the feed stock charging rate is increased excessively, that the column becomes inoperative and the light phase is forced upwardly through the perforations rather than upwardly through the upcomer conduit.

The extraction column is here illustrated as a vertical tubular column, but other forms of the apparatus are likewise utilizable in the process, including tank-like structures in which the longitudinal axis is horizontal, containing substantially horizontally disposed trays therein. Although the column is generally operated with the solvent phase comprising the phase of relatively greater density, thus entering the top of the column and flowing downwardly through the perforated plates against a light feed stock phase entering the bottom of the column, the direction of flow of the respective liquids may be reversed and the feed stock intended to be subjected to washing or extraction introduced into the top of the column as the dense phase and the solvent or washing fluid introduced into the bottom of the column as the liquid phase of least specific gravity. Furthermore, other liquid level following means or control devices may be employed in the column other than the ball float apparatus illustrated on the diagram, including various electronic or pneumatic liquid level sensing devices and control means commonly employed in the art at present.

The washing column is illustrated in Figure 1 as having a dense liquid flow control means in the dense liquid outlet conduit which responds to the interface level control means in the uppermost contacting zone of the column and although it is generally preferred to thereby control the interface level by controlling the flow rate of extract phase from the column, as illustrated in Figure 1, similar control of the interface levels in each of the contacting zones within the column may be obtained by a flow control means in the dense liquid inlet conduit. The interface level sensing means in the uppermost contacting zone on the top perforated partition of the column in this latter alternative arrangement connects with the flow control means in said dense liquid inlet conduit and the flow of dense liquid into the column is controlled in response to the flow control impulses from said interface level sensing means.

Although the present process and apparatus have been described with reference to the use of an aqueous oxydiethylene glycol solution as the solvent, it is evident that other extractants may likewise be utilized, provided the feed stock and solvent fluids differ in specific gravities or densities and provided, further, that the fluids are substantially immiscible in each other, thereby providing the conditions essential for the formation of an interface between the feed stock and solvent phases.

We claim as our invention:

1. In a process for countercurrently contacting a light fluid with a relatively dense liquid which is substantially immiscible with the light fluid in a vertically elongated column having vertically spaced perforated partitions dividing the column into a plurality of contacting zones, the method which comprises introducing said dense liquid into the uppermost contacting zone for downward flow through the column, introducing said light fluid into the lowermost contacting zone for upward passage through the column, maintaining in each of the contacting zones a lower layer of the dense liquid and an upper layer of the light fluid separated by an interface therebetween, passing dense liquid in subdivided form from the lower layer in each of said zones except the lowermost through the light fluid layer in the next lower zone and then into the dense liquid layer in the last-named zone, withdrawing light fluid at the interface in each zone except the uppermost and passing the same upwardly through and out of contact with the light fluid layer immediately above said interface and upwardly through and out of contact with the dense liquid layer above the last-named light fluid layer into the next higher light fluid layer in the column, regulating the flow rate of said dense liquid to maintain the interface in said uppermost zone at a substantially constant level whereby the interface in each of the lower zones remains at a substantially constant predetermined level, removing the contacted light fluid from said uppermost zone and from the column, and withdrawing the dense liquid from the lowermost zone and from the column.

2. The process of claim 1 further characterized in that said dense liquid is introduced into said uppermost contacting zone as a liquid spray.

3. The process of claim 1 further characterized in that said light fluid is a hydrocarbon fraction.

4. The process of claim 1 further characterized in that said relatively dense liquid is an aqueous oxydiethylene glycol solution and said light fluid is a petroleum naphtha fraction containing aromatic hydrocarbons to be recovered from said naphtha.

5. A contacting apparatus comprising a vertically elongated column, vertically spaced, substantially horizontal perforated partitions dividing the column into a plurality of contacting zones, means for introducing liquid to and for removing fluid from the uppermost zone, means for introducing fluid to and removing liquid from the lowermost zone, an open-ended conduit extending substantially vertically through each of said partitions and comprising a riser portion extending into the contacting zone above the partition and a downcomer portion extending into the contacting zone below the partition, the open end of the riser portion of each conduit being at a higher elevation than the open end of the downcomer portion of the next higher conduit in the column, and interface level sensing means in said uppermost zone adapted to control liquid flow rate in response to variations in interface level between liquid and fluid in the uppermost zone.

6. The apparatus of claim 5 further characterized in that the riser portion of the conduit is provided with a baffle over its open end.

7. The apparatus of claim 5 further characterized in that the open end of the downcomer portion of the conduit is bevelled.

GLEN R. GRUNEWALD.
FRED J. PIERCE.

References Cited in the file of this patent

UNITED STATES PATENTS

| Number | Name | Date |
|---|---|---|
| Re. 21,725 | Harrington | Feb. 25, 1941 |
| 2,248,220 | Dons et al. | July 8, 1941 |
| 2,520,391 | Findlay | Aug. 29, 1950 |